(12) United States Patent
Hellmann et al.

(10) Patent No.: US 6,932,441 B2
(45) Date of Patent: Aug. 23, 2005

(54) METHOD FOR REGULATING THE SPEED OF A MOTOR VEHICLE

(75) Inventors: Manfred Hellmann, Hardthof (DE); Ralph Lauxmann, Korntal-Muenchingen (DE); Albrecht Irion, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 10/297,952

(22) PCT Filed: Feb. 16, 2002

(86) PCT No.: PCT/DE02/00575

§ 371 (c)(1), (2), (4) Date: Jun. 2, 2003

(87) PCT Pub. No.: WO02/083447

PCT Pub. Date: Oct. 24, 2002

(65) Prior Publication Data

US 2004/0041471 A1 Mar. 4, 2004

(30) Foreign Application Priority Data

Apr. 12, 2001 (DE) .......................................... 101 18 708

(51) Int. Cl.[7] .................................................. B60T 8/74
(52) U.S. Cl. .......................... 303/177; 303/125; 701/70
(58) Field of Search ...................... 188/181 A; 303/191, 303/193, 177, 184, 125; 701/70, 93, 96

(56) References Cited

U.S. PATENT DOCUMENTS 5,505,531 A  * 4/1996  Griffith et al. .......... 188/181 A
5,731,977 A    3/1998  Taniguchi et al.
6,134,497 A  * 10/2000 Hayashi et al. ................ 701/96
6,149,251 A  * 11/2000 Wuerth et al. ................ 701/70
6,591,180 B1 *  7/2003  Steiner ........................ 701/96

FOREIGN PATENT DOCUMENTS

| DE | 26 42 211 | 6/1978 | |
|---|---|---|---|
| DE | 34 23 063 | 1/1986 | |
| DE | 196 15 294 | 10/1997 | |
| DE | 198 27 445 | 12/1998 | |
| EP | 0 166 258 | 1/1986 | |
| EP | 0 612 641 | 8/1994 | |
| EP | 0 965 508 | 12/1999 | |
| EP | 1 075 977 | 2/2001 | |
| JP | 2001233089 A  * | 8/2001 | ........... B60K/41/20 |
| WO | WO 99/20508 | 4/1999 | |

OTHER PUBLICATIONS

Winner, et al., "Adaptive Cruise Control System—Aspects and Development Trends," SAE Technical Paper Series 961010, International Congress & Exposition, Detroit, Feb. 1996.

* cited by examiner

*Primary Examiner*—Thomas Williams
(74) *Attorney, Agent, or Firm*—Kenyon & Kenyon

(57) ABSTRACT

In a method for controlling the speed of a motor vehicle, an acceleration-demand signal is generated which represents a positive or negative setpoint acceleration of the vehicle, and either a control command is output to the engine or a control command is output to braking system of the vehicle as a function of this signal, wherein a signal for preloading the braking system is output when the acceleration-demand signal falls below a threshold value which lies above a value at which the braking system is activated.

14 Claims, 3 Drawing Sheets

METHOD FOR REGULATING THE SPEED OF A MOTOR VEHICLE

FIELD OF THE INVENTION

The present invention relates to a method for controlling the speed of a motor vehicle, in which an acceleration-demand signal is generated which represents a positive or negative setpoint acceleration of the vehicle, and either a control command is output to the engine or a control command is output to the braking system of the vehicle as a function of this signal.

BACKGROUND INFORMATION

A method of this type is discussed in the publication "Adaptive Cruise Control System—Aspects and Development Trends" by Winner, Witte, Uhler and Lichtenberg, Robert Bosch GmbH, in the SAE Technical Paper Series 961010, International Congress & Exposition, Detroit, Feb. 26–29, 1996. The control system discussed in this publication, also known as an ACC system (adaptive cruise control), is based on a distance sensor, e.g. a radar sensor having multiple-target capability, which is mounted on the front side of the vehicle in order to measure distances to and relative speeds of preceding vehicles. As a function of the measurement data of this radar system, the speed of a driver's vehicle is then controlled in such a manner that a predefined distance, which the driver is able to determine in the form of a so-called setpoint time gap, is maintained to the immediately preceding vehicle. If there is no preceding vehicle in the locating range of the radar, control is carried out to a desired speed set by the driver.

For example, normally this system intervenes, via a throttle valve, in the drive system of the vehicle so that the vehicle speed is regulated via the drive torque of the engine. However, when, for example, on downhill grades, or when, necessitated by distance, a stronger deceleration of the vehicle may be necessary, the drag torque of the engine is not adequate to bring about a sufficient deceleration of the vehicle, then an intervention in the braking system of the vehicle is carried out.

To permit a stable control and to avoid adversely influencing the comfort or driving safety, the control system should react with the shortest possible delay time to the control commands output to the drive system or braking system. However, upon activation of the vehicle brake, a certain delay in response results due to the fact that the wheel brake cylinders and the remaining components of the hydraulic braking system have a certain dead volume which may need to first of all be filled with brake fluid before the brakes at the individual wheels of the vehicle actually become effective.

German Published Patent Application No. 196 15 294 relates to a device for controlling the braking force at the wheels of a vehicle, in which prior in time to the actual pressure buildup necessary for adjusting the required braking torque, a small braking pressure in the form of a time-restricted fill pulse is fed into the braking system. Here, the fill pulse is generated individually for the wheel brakes of the individual wheels as a function of movement variables of the vehicle, particularly as a function of a system deviation of the lateral acceleration of the vehicle and its time derivation. German Published Patent Application No. 34 23 063 relates to a traction control system for vehicles, in which a small braking pressure is fed as a function of the change in the throttle valve position, as a function of the vehicle speed or as a function of slip thresholds which lie below the response threshold for the actual traction control.

SUMMARY

It is an object of the present invention to provide a method for controlling speed such that the response time to a control command output to the braking system is shortened.

In an exemplary embodiment of the present invention, a signal for preloading the braking system is output when the acceleration-demand signal falls below a threshold value which is above a value at which the braking system is activated.

To be understood here generally by "preloading" of the braking system is a measure which shifts the braking system into a state in which it is able to react more quickly to a braking command without a substantial braking action already occurring. For example, this preloading may occur in that a certain braking-pressure buildup takes place in the wheel-brake cylinders and/or in the components of the hydraulic system which are arranged directly in front of them, so that the brake shoes are already approaching or even already touching the brake disk or brake drum of the wheel brake without, however, a significant frictional force already being exerted. Alternatively or additionally, the preloading may also be produced by making a certain admission pressure available in a pressure accumulator or in a brake booster, which allows the dead volume to fill up faster upon actual operation of the brake.

Since, according to an exemplary embodiment of the present invention, the signal for preloading the braking system, also known in the following as "fill signal", is not first generated in the braking system itself, but rather is already generated within the framework of the speed control, faster buildup of braking pressure may also be made useful for the speed control.

When, in the scope of the speed control, an intervention into the braking system of the vehicle may be necessary for whatever reason, this may announce itself in that the acceleration-demand signal becomes negative and approaches a value at which the deceleration attainable by the tractive resistance and the drag torque of the engine is no longer sufficient, and therefore it may be necessary to switch over to braking operation. By comparing the acceleration-demand signal to a suitable threshold value, it is therefore possible to recognize an imminent switchover to braking operation early and to preventatively preload the braking system, so that the braking system reacts more quickly in the event of actual activation. The shortening of the control delay thereby achieved makes it possible to better suppress unwanted control oscillations. In the case of a distance control, this means at the same time that falling below the setpoint distance is minimized, so that not only is comfort improved, but driving safety is increased as well.

Since according to an exemplary embodiment of the present invention, a drop of the acceleration-demand signal below a threshold value is utilized as a criterion for the output of the fill signal, the use of the method is independent of which control goals are being pursued with the speed control and which control algorithms are being used in detail. The method of an exemplary embodiment of the present invention is therefore applicable for a large range of different control concepts, and permits high flexibility with respect to later modifications or expansions of the control system.

The criterion for the actual activation of the braking system may possibly be defined in that the acceleration-demand signal falls below a triggering threshold which, on its part, may be varied dynamically as a function of the driving situation. The threshold value for the preloading of the braking system may then lie by a fixed differential amount above this triggering threshold. In practice, a lower limit is defined for the change rate of the acceleration-demand signal over time, this limit ensuring that the comfort and the feeling of safety for the vehicle passengers are not impaired by decelerations applied in a jerky manner. On the basis of this limit and on the basis of the filling time—determined by the design of the braking system—which may be necessary for preloading the braking system, it is possible to continually select the differential amount between the threshold value for the preloading of the braking system and the actual triggering threshold so that the preloading process is concluded before the brake is actually activated.

The decisive quantity for determining the triggering threshold may be the maximum vehicle deceleration, i.e. the minimum (negative) acceleration $a_{min}$ which may be produced by the drag torque of the engine (with the throttle valve closed to the maximum). First and foremost, this minimum acceleration $a_{min}$ is a function of the transmission step and the operating conditions of the engine, and may be calculated from variables which are made available by the engine management system and other control elements or sensors of the vehicle via a data bus. For refinement, further criteria may also be utilized for determining $a_{min}$, particularly the rise or the gradient of the roadway and, optionally, the payload of the vehicle. The relevant variables may be measured directly or may be derived indirectly from the correlation between the instantaneous output torque of the engine and the measured vehicle acceleration. The output torque of the engine may either be measured directly or be ascertained from the information about the state of the throttle valve, the ignition system, the injection system, etc., available on the data bus.

The fill signal may be canceled again after a specific time span has elapsed. If the acceleration-demand signal remains over a longer time in the interval between the threshold value for the preloading and the triggering threshold, because the driving conditions have stabilized in this area, the brake is thus prevented from remaining pre-loaded for an unnecessarily long time. If the brake is already actually activated before this time span has elapsed, then the fill signal is already reset upon actuation of the brake. In the same manner, the fill signal is also reset when the brake is not automatically actuated within the framework of the speed control, but when the driver himself intervenes in the events and actuates the brake pedal.

However, the fill signal may be switched on once again when, within the framework of the speed control, there is again a switchover from braking operation to engine operation, and thus the brake is released. The fill signal then remains switched on until the acceleration-demand signal again exceeds the threshold value, or until a predetermined time span has elapsed. This measure maintains an increased brake readiness in the event the acceleration-demand signal constantly fluctuates around the triggering threshold.

Alternatively, the same thing may also be achieved in that, after the release of the brake, a special hold signal is generated, the effect of which is that the brake is not released completely, but rather is held in the preloaded state.

To avoid frequent switching of the control system between engine operation and braking operation, it may be possible to provide a specific hysteresis. In this case, the triggering threshold for the switchover to braking operation is given by an acceleration value $a_{hys}$ which is less than $a_{min}$, while the switch back to engine operation takes place when the acceleration-demand signal again becomes greater than $a_{min}$. If the hysteresis interval between $a_{min}$ and $a_{hys}$ varies dynamically, it is possible to couple the threshold value for generating the fill signal to $a_{hys}$. On the other hand, the threshold value at which the fill signal falls off again after the brake is released may remain coupled to $a_{min}$.

DETAILED DESCRIPTION

Figure 1:
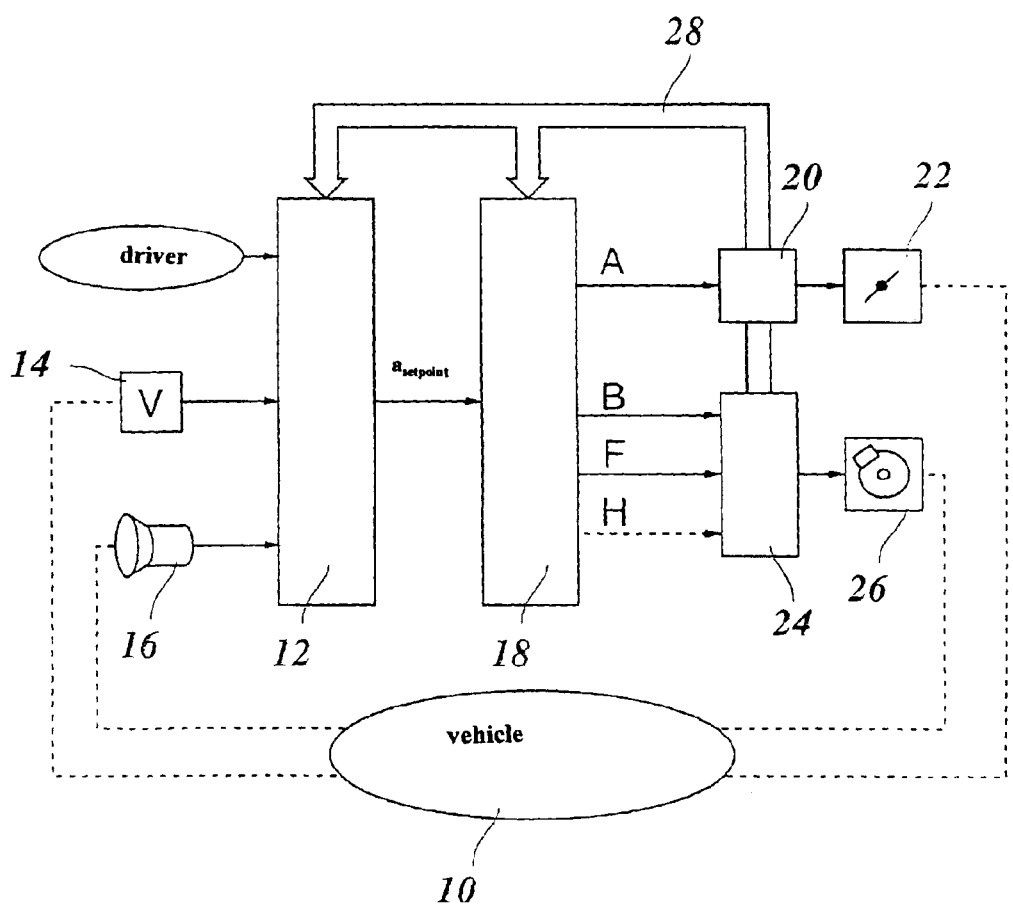
FIG. 1 shows a block diagram of a speed control system for carrying out a method according to an exemplary embodiment of the present invention.

In FIG. 1, a motor vehicle is shown symbolically whose speed is controlled with the aid of an electronic controller 12. To that end, controller 12 receives a signal from a speed sensor 14 which indicates the actual speed of the vehicle. Furthermore, a distance sensor, in the example shown a radar sensor 16, is mounted in the front on the vehicle and reports distance data and relative-speed data of objects located in front of the vehicle to controller 12. Possibly, radar sensor 16 has a certain angular-resolution capability so that the azimuth angle of the located objects may also be detected and reported to controller 12. In this manner, the radar system and/or controller 12 are able to differentiate preceding vehicles in the vehicle's own lane from vehicles in other lanes, as well as from fixed targets at the edge of the roadway. When preceding vehicles are located in the vehicle's own lane, then the immediately preceding vehicle is selected as a target object, and the speed of motor vehicle 10 is controlled in such a manner that a specific setpoint distance is maintained to the preceding vehicle. This setpoint distance is selectable by the driver by the input of a setpoint time gap which indicates the time interval in which the preceding vehicle and the driver's own vehicle pass the same point on the roadway. Therefore, the setpoint distance is adjusted dynamically to the specific traveling speed.

If the roadway in front of the driver's own vehicle is clear, then, provided the driver has given a corresponding command, control is carried out to a desired speed selected by the driver.

Furthermore, controller 12 also evaluates operating commands as well as driving commands by the driver, particularly the degree of actuation of the accelerator and, optionally, of the brake pedal. Consequently, at any time the driver has the possibility of intervening actively in events in order to react appropriately in critical driving situations.

Therefore, various open-loop and closed-loop control strategies are implemented in controller 12, and depending on the driving situation or commands by the driver, one or more control strategies are selected and, as is conventional, their results are combined in a suitable manner to form an acceleration-demand signal $a_{setpoint}$ which indicates the setpoint acceleration of the vehicle at the moment.

Based on acceleration-demand signal $a_{setpoint}$, a decision unit 18 decides whether an intervention in the drive system or in the braking system of the vehicle may be necessary. In response to positive values of the acceleration-demand signal, an intervention is carried out in the drive system. In this case, a control command A is output to an electronic engine management system 20 which acts on the engine of motor vehicle 10 by way of various actuators, symbolized here by a throttle valve 22. In general, the functions of engine management system 20 may include the control of throttle valve 22, the control of the fuel injection system, the ignition and other components of the drive system of the vehicle. In the case of a vehicle having automatic transmission, this may also include the selection of the transmission step. On the basis of control command A and the instantaneous operating parameters of the engine, engine management system 20 controls the engine so that an engine drive torque is produced corresponding to the acceleration-demand signal.

When acceleration-demand signal $a_{setpoint}$ assumes negative values, then first of all the engine is throttled by engine management system 20, so that the drag torque of the engine is utilized for decelerating the vehicle. However, if decision unit 18 determines that the vehicle deceleration thus attainable is not sufficient to keep the actual acceleration of the vehicle in agreement with the setpoint acceleration represented by $a_{setpoint}$, then a switchover to braking operation is carried out by decision unit 18. In this case, the engine remains throttled, and decision unit 18 supplies a control command B to a brake control system 24 of the vehicle.

Brake control system 24, via the hydraulic braking system of the vehicle, controls the functioning of brakes 26 allocated to the individual wheels and fulfills, for example, the function of an antilock braking system, a traction control system and/or an ESP (Electronic Stability Program) system for dynamic stabilization of the vehicle.

For reasons of failure safety, the hydraulic braking system of the vehicle is coupled directly to the brake pedal of the vehicle and contains at least one pressure generator or booster which boosts the braking force exerted by the driver via the brake pedal. Within the framework of the traction control system or the ESP system, the pressure generator is also able to build up a braking pressure independently of the actuation of the brake pedal and to actuate brakes 26. In the same manner, control command B transmitted by decision unit 18 also triggers actuation of the brake with a fixed or variable braking force.

If control command B is output when the vehicle brake is not actuated and the wheel brake cylinders are pressureless, then the dead volume unavoidably present in the hydraulic braking system and particularly in the wheel brake cylinders may need to first be filled with brake fluid before friction locking between the brake shoes and the brake drums or brake disks actually occurs and the brake becomes effective. To shorten the time which may be necessary for filling this dead volume, brake control system 24 has a function which permits a pre-filling of the braking system. During this process, which shall be designated here as "preloading", the braking system is pressurized to the extent that the dead volumes are filled up and the brake liners move close to the brake disks or brake drums or even already lightly contact them. In the latter case, a slight wear on the brake is accepted.

According to an exemplary embodiment of the present invention, this preloading function may now not only be triggered within brake control system 24, rather it may also be triggered externally by a suitable fill signal which is output in the form of a flag F by decision unit 18. Depending on the state of the braking system, the setting of flag F therefore results in brake control unit 24 triggering a pre-filling of the braking system. If flag F is reset again, then this pre-filling process is canceled by brake control unit 24, provided an actual activation of the brake has not been implemented by control command B in the meantime.

Depending on the design of the braking system, it is also possible to implement in brake control system 24 a "retain" function which provides that the pre-filled state of the braking system is maintained after the brake is released. For instance, this may be carried out by temporarily interrupting the operation of a return pump which delivers the brake fluid back from the wheel brake cylinder. In this case, the "retain-"function may also be initiated by the setting of a corresponding flag H externally by decision unit 18.

The parameters which characterize the state of the engine and the braking system of the vehicle are available in engine management system 20 and brake control system 24, respectively, and may be transmitted to other system components of the vehicle via a data bus 28 (e.g., a CAN bus) so that in case of need, they are also available for evaluation in controller 12 and in decision unit 18.

The changes in the vehicle acceleration caused by the intervention in the drive system or the brake system of the vehicle lead to corresponding changes in the vehicle velocity and the distance to the preceding vehicle, and are coupled back via speed sensor 14 and radar sensor 16.

Figure 2:
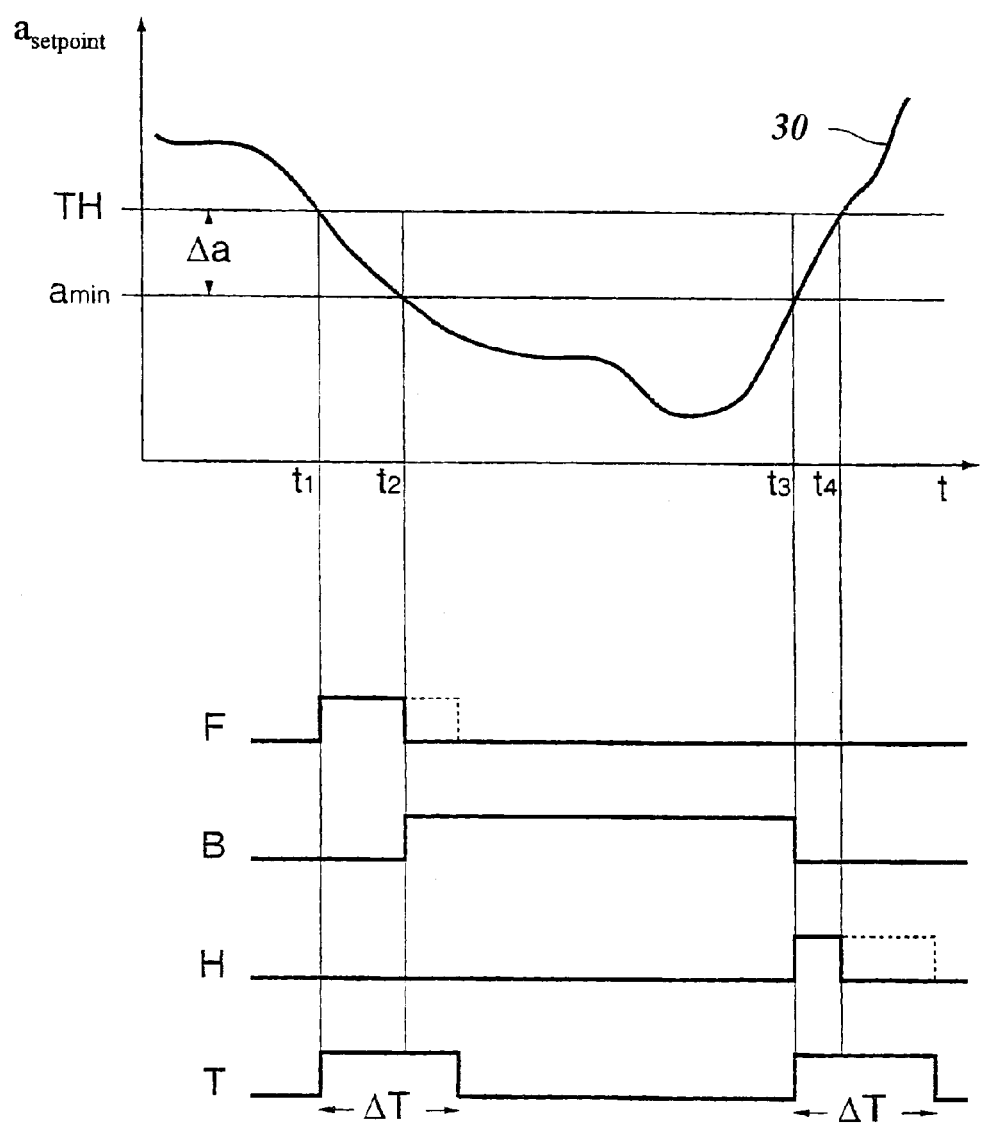
FIG. 2 shows a timing diagram of signals which occur in the control system according to FIG. 1.

In FIG. 2, curve 30 in the upper part of the diagram shows an example for a time characteristic of acceleration signal $a_{setpoint}$ which is output by controller 12. An acceleration value $a_{min}$ represents the smallest possible (negative) acceleration able to be produced by the drag torque of the engine under the instantaneous operating conditions. This acceleration value $a_{min}$ represents a triggering threshold at which decision unit 18 switches from engine operation to braking operation. When $a_{setpoint}$ falls below triggering threshold $a_{min}$ at time $t_2$, decision unit 18 therefore outputs control command B to brake control system 24.

Triggering threshold $a_{min}$ is first of all a function of operating parameters of the engine and of the transmission, for example, the engine speed, the instantaneous engine temperature and the like. This data is available via bus system 28 and may be utilized for calculating $a_{min}$. Moreover, $a_{min}$ is also a function of external conditions, particularly the gradient of the roadway and the inert mass of the vehicle including payload. The corrections to $a_{min}$ caused thereby may be estimated by comparing acceleration control command A to the resulting actual acceleration of the vehicle. However, in one simplified specific embodiment of the method, $a_{min}$ may also be assumed as constant. For instance, in one practical example, $a_{min}$ is on the order of magnitude of $-0.5$ m/s$^2$.

FIG. 2 also indicates a threshold value TH which is greater than $a_{min}$ by a fixed amount $\Delta a$. If $a_{setpoint}$ falls below this threshold value TH at time $t_1$, then flag F is set and the pre-filling of the braking system is thereby initiated. Time $\tau$ needed to pre-fill the braking system is approximately 200 to 300 ms, depending upon the design. Controller 12 is constructed in such a manner that the change rate of acceleration signal $a_{setpoint}$ over time is limited downwards, for example, applicable is: $d/dt(a_{setpoint}) > -1.0$ m/s$^3$. So that the pre-filling of the braking system may be concluded in the time span between $t_1$ and $t_2$, the following must therefore be valid: $\Delta a > |\tau * d/dt(a_{setpoint})|$. Consequently, in the example assumed here, $\Delta a = 0.35$ m/s$^2$ would be a suitable value by which threshold value TH should lie above triggering threshold $a_{min}$. With $a_{min} = -0.5$ m/s$^2$, it therefore follows that: TH$=-0.15$ m/s$^2$.

When acceleration-demand signal $a_{setpoint}$ falls below triggering threshold $a_{min}$ and the brake is actually triggered, then flag F is again reset. If $a_{setpoint}$ does not reach triggering threshold $a_{min}$, flag F is reset at the latest after a predefined time span ΔT has expired which is determined by signal T of a timer. The timer is started when $a_{setpoint}$ reaches threshold value TH (at $t_1$), and signal T then falls off again after predefined time span ΔT has elapsed. With the trailing edge, flag F is also reset again, if it is then still active. This case is drawn in with a dotted line in FIG. 2 for the signal pattern of flag F.

In the example shown, acceleration-demand signal $a_{setpoint}$ rises above triggering threshold $a_{min}$ again at time $t_3$, and at this moment, decision unit 18 switches over again to engine operation, so that control command B output to brake control system 24 falls off again. At this moment, flag H is set which causes the braking system to remain in the pre-loaded state. If the acceleration-demand signal falls below triggering threshold $a_{min}$ again without reaching threshold value TH in between, the brake may therefore be activated again without delay. Only when acceleration-demand signal $a_{setpoint}$ has risen again above threshold value TH (at time $T_4$), or when time span ΔT has elapsed once more, is flag H reset again, and the preloaded state of the braking system is canceled.

In this manner, using a method which may be very simple to implement, it may be ensured that the braking system of the vehicle reacts with the smallest possible delay to control command B for activating the brake.

In the simplest case, flags F and H act on the braking system of the vehicle as a whole. However, it is also possible to have these flags act individually on each single wheel or separately on the front wheels and the rear wheels. In the event the front wheel brakes and the rear wheel brakes are constructed differently, Δa may therefore be adjusted individually to the pre-filling time necessary for the brake in question.

Figure 3:
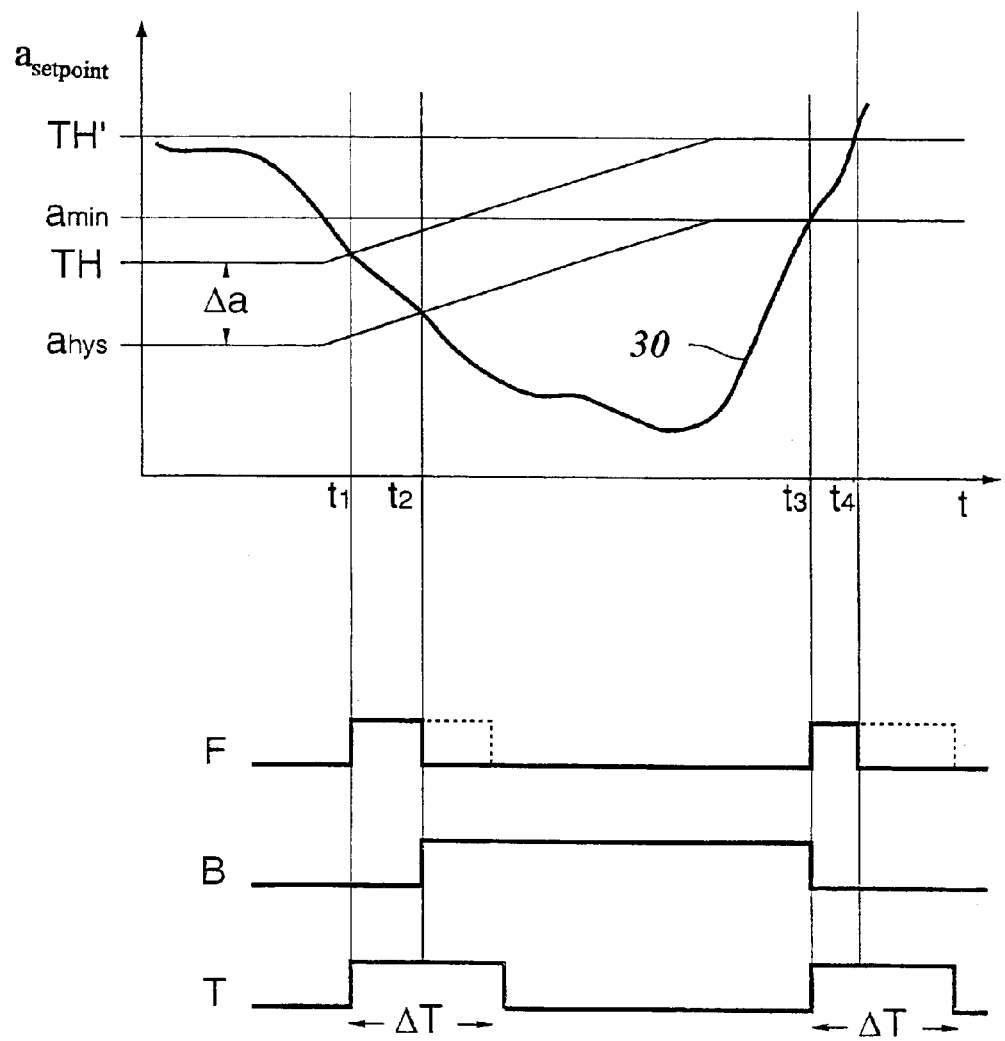
FIG. 3 shows a timing diagram corresponding to FIG. 2 for an alternative exemplary embodiment of the present invention.

FIG. 3 illustrates an exemplary embodiment in which the triggering threshold at which control command B is output to brake control system 24 is not given directly by $a_{min}$, but rather by a somewhat smaller acceleration value $a_{hys}$. However, the switch back to engine operation takes place at moment ($t_3$), at which acceleration-demand signal $a_{setpoint}$ again becomes greater than $a_{min}$. This hysteresis function prevents decision unit 18 from switching between braking operation and engine operation in a "wavering" manner. However, hysteresis interval $a_{min}-a_{hys}$ is not static, but rather is varied dynamically in this example. From the moment at which acceleration-demand signal $a_{setpoint}$ falls below value $a_{min}$, the hysteresis interval is reduced with constant rate of change to 0, so that $a_{hys}$ approaches value $a_{min}$. Although a short-duration drop below $a_{min}$ may be tolerated, when this undershoot persists longer, by raising triggering threshold $a_{hys}$, a switchover to braking operation may take place anyway (in the example shown, at time $t_2$). Threshold value TH, which determines the setting of flag F, is defined here so that it always lies by a fixed amount Δa above variable triggering threshold $a_{hys}$. The flag is reset again upon actual triggering of the brake or after time span ΔT has elapsed.

Furthermore, FIG. 3 illustrates the case when the function "retain" is not implemented in brake control system 24, and consequently no flag H is set by decision unit 18 either. When the brake is released at time $t_3$, then in the specific embodiment shown in FIG. 3, flag F is set once more so that the increased reaction readiness of the brake is still retained for a certain time. When acceleration-demand signal $a_{setpoint}$ rises further and exceeds a threshold value TH', which is greater by Δa than $a_{min}$, flag F is reset again (at time $t_4$). However, the flag may be reset after time span ΔT has elapsed.

On its part, time span ΔT set in the timer may be varied in both exemplary embodiments as a function of the operating state.

We claim:

1. A method for controlling a speed of a vehicle, comprising:

generating an acceleration-demand signal which represents one of a positive setpoint acceleration of the vehicle and a negative setpoint acceleration of the vehicle;

outputting one of a first control command to an engine of the vehicle and a second control command to a braking system of the vehicle as a function of the acceleration-demand signal;

outputting a signal for preloading the braking system when the acceleration-demand signal falls below a threshold value which is above a value at which the braking system is activated;

determining a triggering threshold as a function of a vehicle deceleration; and restricting a change rate of the acceleration-demand signal over time by a lower limit.

2. The method as recited in claim 1, wherein:

the triggering threshold is that at which the braking system is activated by the output of the second control command, and the vehicle deceleration is that which is produceable by a drag torque of the engine under instantaneous operating conditions; and the threshold value, at which the signal for preloading the braking system is output, is above the triggering threshold by a specific amount.

3. The method as recited in claim 1, further comprising:

resetting the signal for preloading the braking system when the braking system is actually activated.

4. The method as recited in claim 3, further comprising:

when the braking system is deactivated, one of renewedly setting the signal for preloading the braking system, and setting a signal for retaining the preloading of the braking system.

5. The method as recited in claim 4, further comprising:

resetting one of the renewedly set signal for preloading the braking system and the signal for retaining the preloading when the acceleration-demand signal exceeds the threshold value.

6. A method for controlling a speed of a vehicle, comprising:

generating an acceleration-demand signal which represents one of a positive setpoint acceleration of the vehicle and a negative setpoint acceleration of the vehicle;

outputting one of a first control command to an engine of the vehicle and a second control command to a braking system of the vehicle as a function of the acceleration-demand signal;

outputting a signal for preloading the braking system when the acceleration-demand signal falls below a threshold value which is above a value at which the braking system is activated; and determining a triggering threshold, at which the braking system is activated by the output of the second control command, as a function of a vehicle deceleration that is produceable by a drag torque of the engine under instantaneous operating conditions, wherein the threshold value, at which the signal for preloading the braking system is output, is above the triggering threshold by a specific amount;

restricting a change rate of the acceleration-demand signal over time by a lower limit, wherein the specific amount is greater by an amount than a product of the lower limit and a time necessary for preloading the braking system.

7. The method as recited in claims 6, further comprising resetting the signal for preloading the braking system when the braking system is actually activated.

8. The method as recited in claim 7, further comprising:

one of, when the braking system is deactivated, renewedly setting the signal for preloading the braking system, and setting a signal for retaining the preloading of the braking system.

9. The method as recited in claim 8, further comprising:

resetting one of the renewedly set signal for preloading the braking system and the signal for retaining the preloading when the acceleration-demand signal exceeds the threshold value.

10. The method as recited in claim 8, further comprising:

resetting at least one of the signal for preloading the braking system and the signal for retaining the preloading after a time span has elapsed which is one of fixed and variable as a function of the instantaneous operating conditions.

11. A method for controlling a speed of a vehicle, comprising:

generating an acceleration-demand signal which represents one of a positive setpoint acceleration of the vehicle and a negative setpoint acceleration of the vehicle;

outputting one of a first control command to an engine of the vehicle and a second control command to a braking system of the vehicle as a function of the acceleration-demand signal;

outputting a signal for preloading the braking system when the acceleration-demand signal falls below a threshold value which is above a value at which the braking system is activated;

resetting the signal for reloading the braking system when the braking system is actually activated;

when the braking system is deactivated, one of renewedly setting the signal for preloading the braking system, and setting a signal for retaining the preloading of the braking system; and resetting at least one of the signal for preloading the braking system and the signal for retaining the preloading after a time span has elapsed which is one of fixed and variable as a function of the instantaneous operating conditions.

12. The method as recited in claim 11, further comprising:

determining a triggering threshold as a function of a vehicle deceleration; and restricting a change rate of the acceleration-demand signal over time by a lower limit.

13. The method as recited in claim 12, wherein:

the triggering threshold is that at which the braking system is activated by the output of the second control command, and the vehicle deceleration is that which is produceable by a drag torque of the engine under instantaneous operating conditions; and the threshold value, at which the signal for preloading the braking system is output, is above the triggering threshold by a specific amount.

14. The method as recited in claim 13, wherein the specific amount is greater by an amount than a product of the lower limit and a time necessary for preloading the braking system.

* * * * *